Feb. 10, 1970    J. O. CAVANAGH ET AL    3,495,069
WELDING ELECTRODE
Filed April 24, 1967
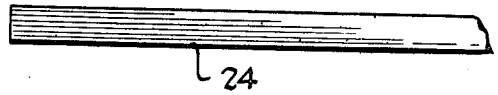
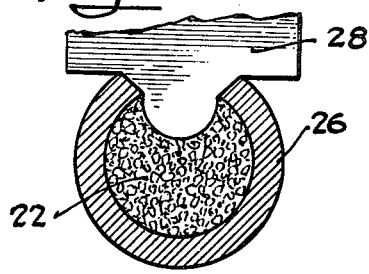 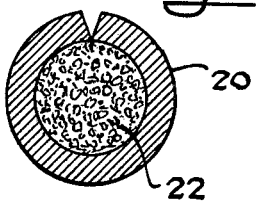 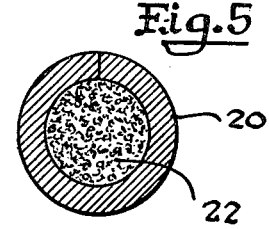
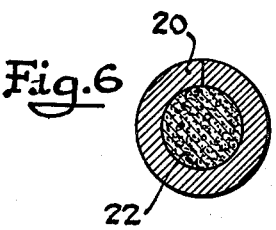 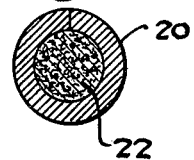 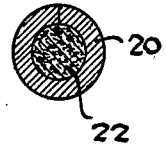 
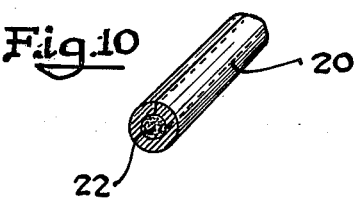
Inventors
John O. Cavanagh
Donald C. Helton
By  *Attorney*

United States Patent Office 3,495,069
Patented Feb. 10, 1970

3,495,069
WELDING ELECTRODE
John O. Cavanagh and Donald C. Helton, York, Pa., assignors to Chemetron Corporation, Chicago, Ill., a corporation of Delaware
Filed Apr. 24, 1967, Ser. No. 632,996
Int. Cl. B23k 35/22
U.S. Cl. 219—146                          3 Claims

ABSTRACT OF THE DISCLOSURE

A tubular electric arc welding electrode including a stainless steel skelp and filler material of metallic composition enveloped therein for producing stainless steel weld deposits.

---

This invention relates to electric arc welding electrodes for depositing stainless steel in the form of overlay deposits on a steel member and in the form of fusion welds which join steel members.

Consumable stainless steel electrodes for gas shielded metal arc welding and submerged arc welding have traditionally been manufactured as solid wire. When automatic welding equipment is used, the welding arc is normally surrounded by a gas or a mixture of gases or submerged in flux which effectively shields the weld area from the detrimental effects of the surrounding atmosphere. The shielding gas may be monatomic, such as argon or helium, but may also contain deliberate additions of oxygen or carbon dioxide for arc stability. Many other mixtures have been used successfully. Conventional submerged arc fluxes may be used.

Considerable difficulty has been encountered in the past with fabricated stainless electrode construction. Chromium or chromium-nickel stainless steel weld metal compositions can be produced by using a consumable fabricated electrode wire which is formed as a tube of carbon steel, the hollow thereof filled with alloys in granular form that contain chromium and/or nickel. As the tube and central core are melted together in the welding arc during the welding process, a stainless steel weld metal composition results. The disadvantage of such carbon steel construction is that the tube metal must be relatively thin in order to allow sufficient space in the center to accommodate the necessary amounts of chromium and nickel for producing stainless steel weld beads. Such thin wall tubular construction has the disadvantage of fragility. Also, thin wall carbon steel tubing is susceptible of rusting in storage. It is also easily deformed or crushed in the feed rolls used to drive the wire when automatic or semiautomatic welding equipment is employed. Further, such thin wall construction has a relatively low welding current carrying capacity.

It is an object of this invention to provide a novel tubular metal arc welding electrode for depositing stainless steel weld metal.

Another object of this invention is to provide a welding electrode capable for use in joining stainless steel parts and in joining carbon and low alloy steel parts to stainless steel, as well as in depositing stainless steel overlays on carbon and low alloy steel at a reasonable cost and with less difficulty.

This invention also contemplates the provision of a welding electrode having both resistance to oxidation which extents shelf life and increased firmness to withstand the pressure of the feed rolls during automatic or semiautomatic welding.

Further objects, as well as features and advantages of this invention will become apparent as the following description of an illustrated embodiment thereof proceeds and is made for the purpose of disclosure and is taken in conjunction with the accompanying drawings in which like character references designate like parts throughout the several views and where:

FIGURE 1 is a fragmentary plan view of a strip of metal used in forming an electrode incorporating the principles of this invention;

FIGURE 2 is a longitudinal side view of the strip of metal shown in FIGURE 1;

FIGURE 3 is a fragmentary cross-sectional view of the partially closed electrode being filled;

FIGURES 4 and 5 are successive cross-sectional views of the electrode as it is closed and its fill is compressed;

FIGURES 6 to 9 are cross-sectional views of the electrode successively reduced to different sizes; and FIGURE 10 is a broken perspective view of a short length of the electrode.

All of the FIGURES 2 to 10 are greatly enlarged.

According to this invention, a stainless steel weld bead exhibiting uniform weld metal properties is obtained during a welding operation from a novel arc welding electrode which is characterized by good arc stability and good deposition rate, as well as general useability.

The electrode of this invention comprises an elongated metal tube 20 formed of chromium stainless steel having an elongated cavity therein and a core 22 of granular material of special alloy characteristics disposed within and filling said cavity substantially uniformly along the length of the electrode. The electrode body is made with a relatively heavy wall construction of alloy steel for filler metal and for better feeding and arc properties. This electrode construction is particularly applicable to use in gas shielded welding processes, where the electrode is fed by suitable feed mechanism to the arc which is protected with a shielding gas as well as in submerged arc processes. It is also contemplated that the subject matter of this invention may be incorporated in lengths of manual or stick welding electrodes.

In order to deposit weld metal having a stainless steel analysis, part of the necessary stainless steel alloy, such as chromium, is contained in the tube material. With a portion of the alloy being contained in the wall of the electrode, a heavier wall material for the tubing is possible since it is not necessary to allow so great a space in the center of the tube for the granular alloys. To insure that the electrode is substantially uniform along its length the core material is very highly compressed within the tube. Strip 24 of stainless steel having proper dimensions is cold formed by suitable equipment into the tubular configuration. The strip 24 is put through forming rolls to change it into an upwardly open trough-like piece 26 (FIG. 3). The granular material is placed inside the tubing and metered to the proper amount by a doctor blade or scraper 28 before it is completely closed. Thereafter, the electrode is closed progressively through stages illustrated in FIGS. 3 and 4 to the final stage shown in FIG. 5. A butt seam is possible due to the thickness of the tube metal and the tubing is thus closed about the granular alloys as opposed to an overlapped joint which is necessary for joining the edges of thin carbon steel strip material that is used in the production of thin wall tubular electrodes. The butt joint provides a uniform amount of solid metal around the periphery of the electrode, whereas the overlapped joint, with a double thickness around part of the periphery, melts off to one side during welding. A further undesirable feature of the thin walled construction is that control of the arc is difficult. By this invention's concentrically uniform construction, metal is uniformly deposited with improved arc control. After the filled tubular structure is formed, it is successively drawn through suitable dies or rolled down to selected wire sizes through steps as illustrated in FIGS. 7 to 9. This further compacts uniformly the granular core within the tube without voids along the length of a long coil of electrode.

The undesirable features of known arc welding electrodes make it difficult to deposit stainless steel weld metal of predetermined chemical composition. This invention has overcome these difficulties and has reliably deposited weld metals which fall within the ranges of austenitic type stainless steels, such as AISI types 308, 308L, 309, 309L, 316 and 316L and 347 stainless steel on various base metals. Arc temperatures reached during the welding process adjust the chemistry of the skelp and the core to provide the desired weld metals.

The typical chemical analysis of the above types of stainless steel is as follows:

Type 308: | Percent
--- | ---
Carbon (maximum) | 0.08
Manganese (maximum) | 2.00
Silicon (maximum) | 1.00
Chromium | 19.00–22.00
Nickel | 10.00–12.00

Type 308L: | Percent
--- | ---
Carbon (maximum) | 0.04
Manganese | 1.50
Silicon | 0.35
Chromium | 19.80
Nickel | 10.20

Type 309: | Percent
--- | ---
Carbon (maximum) | 0.10
Manganese (maximum) | 2.00
Silicon (maximum) | 1.00
Chromium | 22.00–24.00
Nickel | 12.00–15.00

Type 309L: |
--- | ---
Carbon (maximum) | 0.04
Manganese | 1.30
Silicon | 0.35
Chromium | 23.10
Nickel | 12.40

Type 316: | Percent
--- | ---
Carbon (maximum) | 0.08
Manganese (maximum) | 2.00
Silicon (maximum) | 1.00
Chromium | 16.00–18.00
Nickel | 10.00–14.00
Molybdenum | 2.00–3.00

Type 316L: | Percent
--- | ---
Carbon (maximum) | 0.04
Manganese | 1.40
Silicon | 0.30
Chromium | 18.80
Nickel | 12.80
Molybdenum | 2.15

Type 347: | Percent
--- | ---
Carbon (maximum) | 0.08
Manganese (maximum) | 2.00
Silicon (maximum) | 1.00
Chromium | 17.00–19.00
Nickel | 9.00–13.00
Columbium | 10× Carbon min.

This invention advantageously employs a steel for the tubular portion of martensitic stainless steel, such as one which contains approximately 12% chromium, for example, a modified AISI Type 410, and which has sufficient alloy material so that when the tube and granular material therein are melted, weld metal deposits therefrom are of a stainless steel composition commonly designated as AISI Type 300 series. Ferritic stainless steel is equally beneficial as skelp material to deposit weld metals of the austenitic stainless steel types.

A typical analysis by weight of the type 410 envelope is as follows:

| | Percent |
--- | ---
Carbon | 0.05
Manganese | 0.34
Phosphorus | 0.012
Sulfur | 0.009
Silicon | 0.37
Chromium | 12.28

This type of 410 steel, however, is heat treatable, meaning that it will harden when heated to red heat and cooled rapidly. It is necessary to join lengths of the strip material 24 in order to form substantial lengths of the tube. This step is particularly necessary to form continuous finished welding electrode used in a continuous welding process. The strip must be heated at least to a red heat and is cooled rapidly to accomplish joining during the formation of the tube. This ordinarily causes the strip to become hard and brittle so that it cannot be satisfactorily formed into a tube in the welded area.

This invention has overcome the aforedescribed difficulty by modifying the AISI Type 410 stainless steel with a sufficient addition of one of the metals from the group including titanium, columbium, or tantalum, to prevent hardening. For example about 0.50% of one of these metals, renders the strip non-heat hardenable when heated to a red heat and cooled rapidly.

In using the electrode of this invention with equipment wherein the welding arc is shielded by a gas, this shielding gas may be 100% argon or helium. The arc is stable under these conditions. This is not the case when using solid stainless wire or fabricated tubular wires made from carbon steel sheath. This has been found to be true for alloy steel sheath containing in particular 10% to 20% chromium, and also extends from about 5% (AISI Type 502) through 28% (AISI Type 446). The reason for the arc stability of tubular electrodes made from these chromium steel sheaths is not clearly understood. The advantage of the present invention is that there is a higher alloy recovery of the oxidizable elements such as manganese, silicon, chromium and columbium.

Solid wires and tubular wires made from carbon steel sheath generally require an addition of at least 1% oxygen and often 2 to 5% oxygen to the inert shielding gas in order to stabilize the arc. Frequently up to 25% carbon dioxide may be added to the argon or helium, instead of the oxygen. Conventional submerged fluxes for stainless steel arc welding may also be used.

The core material contained within a typical tubular envelope of AISI 400 series Chromium Steel described above is a granular core filler composition of:

| Core material composition: | Broad range, percent by weight |
--- | ---
Low carbon ferro manganese (80% manganese) and/or low carbon manganese metal (99% manganese) | 0–12
Low carbon ferro chromium (70% chromium)) and/or low carbon chromium metal (99% chromium) | 40–65
Nickel metal (99% nickel) | 30–45
Ferro molybdenum (60% molybdenum) | 0–20
Ferro columbium (60% columbium) | 0–10
Low carbon iron (99% iron) | 0–15

The range of thickness of the envelope to produce a satisfactory deposit of stainless steel weld material is from about 12.5% to about 25% of the formed electrode diameter which improves its rigidity. This amounts to 54.6% to 82.4% of the total weight of the finished tubular electrode. The core material represents from about 17.6% to about 45.4% of the total electrode weight.

In the above example, the electrode was assembled with a ratio of cross-sectional area of filler material to the cross-sectional area of the total tubular electrode of 0.41. This electrode was employed in a welding operation and it deposited a weld metal of stainless steel composition, essentially 19% chromium and 9% nickel which as hereinbefore described is commonly designated as AISI Type 308.

By controlling the amount of chromium in both the skelp and filler material of the electrode, as described, the chromium content in the weld bead will be within the designed range despite the fact that some of the alloy metal is diluted with the steel of the base metal during welding.

When the electrode of this invention is used semiautomatically in 3/32 diameter with the gas shielded metal arc process, a direct current of reversed polarity is used with settings at 300 to 400 amperes and from 29 to 31 volts. Automatic welding may be conducted at settings of from 350 to 450 amperes and 28 to 32 volts. When pure argon is used a flow rate of about 45 c.f.h. is recommended.

Thus, it will be appreciated that all of the cited objects, advantages and features of the present invention have been demonstrated as obtainable in a highly practical structure. It will be further understood that, although the invention has been described with respect to certain specific embodiments thereof, it is not limited thereto, since various modifications of said invention will suggest themselves from the aforesaid description and are intended to be encompassed within the scope of the appended claims wherein there is claimed:

1. An electric arc welding electrode for depositing austenitic type stainless steel and adapted to be successively drawn or rolled down to selected wire sizes, comprising a tubular envelope formed of an AISI Series 400 martensitic stainless steel and having a butt seam and a core material within the envelope representing approximately from 17.6% to 45.4% of the total weight of the electrode and including alloys by approximate weight as follows:

|  | Percent |
|---|---|
| Low carbon manganese (about 80% to 99% manganese) | About 0–12 |
| Low carbon chromium (about 70% to 99% chromium) | About 40–65 |
| Nickel metal (about 99% nickel) | About 30–45 |
| Ferro molybdenum (about 60% molybdenum) | About 0–20 |
| Ferro columbium (about 60% columbium) | About 0–10 |
| Low carbon iron (about 99% iron) | About 0–15 |

2. The electrode as claimed in claim 1 wherein the martensitic stainless steel of the envelope contains at least one metal from the group consisting of columbium, titanium and tantalum.

3. An electric arc welding electrode for depositing austenitic type stainless steel and adapted to be successively drawn or rolled down to selected wire sizes, comprising a tubular envelope formed of an AISI Series 400 ferritic stainless steel and having a butt seam and a core material within the envelope representing approximately from 17.6% to 45.4% of the total weight of the electrode and including alloys by approximate weight as follows:

|  | Percent |
|---|---|
| Low carbon manganese (about 80% to 99% manganese) | About 0–12 |
| Low carbon chromium (about 70% to 99% chromium) | About 40–65 |
| Nickel metal (about 99% nickel) | About 30–45 |
| Ferro molybdenum (about 60% molybdenum) | About 0–20 |
| Ferro columbium (about 60% columbium) | About 0–10 |
| Low carbon iron (about 99% iron) | About 0–15 |

References Cited

UNITED STATES PATENTS

| 2,493,143 | 1/1950 | Ingels | 219—46.5 |
| 2,564,474 | 8/1951 | Feild | 75—126 X |
| 3,016,452 | 1/1962 | Wilcox | 219—146 |
| 3,101,405 | 8/1963 | Wilcox | 219—146 |
| 3,139,507 | 6/1964 | Kaesmacher | 219—137 X |

FOREIGN PATENTS 988,188 4/1965 Great Britain.

JOSEPH V. TRUHE, Primary Examiner

B. A. STEIN, Assistant Examiner